United States Patent
Fryc et al.

(10) Patent No.: US 10,018,172 B2
(45) Date of Patent: Jul. 10, 2018

(54) PROVIDING A BOOST VOLTAGE WITH A TRANSIENT OPERATION

(71) Applicants: David Ronald Fryc, Berkley, MI (US); Harold Ryan Macks, Redford, MI (US); Mike Lees, Chelmsford (GB); Joe Pulis, Canton, MI (US)

(72) Inventors: David Ronald Fryc, Berkley, MI (US); Harold Ryan Macks, Redford, MI (US); Mike Lees, Chelmsford (GB); Joe Pulis, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 715 days.

(21) Appl. No.: 14/470,640

(22) Filed: Aug. 27, 2014

(65) Prior Publication Data
US 2016/0061171 A1    Mar. 3, 2016

(51) Int. Cl.
  *B60R 16/02* (2006.01)
  *F02N 11/08* (2006.01)
  *F02N 19/00* (2010.01)
  *B60R 16/03* (2006.01)

(52) U.S. Cl.
  CPC .......... *F02N 11/0814* (2013.01); *B60R 16/02* (2013.01); *B60R 16/03* (2013.01); *F02N 11/0862* (2013.01); *F02N 19/00* (2013.01); *F02N 2200/061* (2013.01); *F02N 2200/062* (2013.01); *F02N 2200/063* (2013.01); *F02N 2200/101* (2013.01); *F02N 2300/2002* (2013.01); *Y02T 10/48* (2013.01)

(58) Field of Classification Search
  CPC ..... B60R 16/02; B60R 16/03; F02N 11/0814; F02N 11/0862; F02N 19/00
  See application file for complete search history.

(56) References Cited

U.S. PATENT DOCUMENTS

| | | | | |
|---|---|---|---|---|
| 2007/0278990 | A1* | 12/2007 | Raichle | H02J 7/0029 320/104 |
| 2009/0321166 | A1* | 12/2009 | Falkenstein | B60K 6/48 180/65.285 |
| 2014/0252849 | A1* | 9/2014 | Rao | B60R 16/02 307/10.1 |
| 2014/0278022 | A1* | 9/2014 | Shoji | F02N 11/0862 701/113 |

FOREIGN PATENT DOCUMENTS

| JP | 2011-21566 A | 2/2011 |
|---|---|---|
| JP | 5430265 B2 | 2/2014 |

* cited by examiner

*Primary Examiner* — Jared Fureman
*Assistant Examiner* — Joel Barnett
(74) *Attorney, Agent, or Firm* — Dickinson Wright PLLC (57) ABSTRACT

A system, method and circuit for providing a boost voltage with a transient operation of a vehicular start-stop system are provided. The system includes a duty cycle or current monitor to detect a change in duty cycle or current based on the transient operation; a crank time-out detector to determine whether the change in duty cycle is over a predetermined threshold; and a reset generator to generate a reset of a boost circuit that generates the boost voltage after a predetermined delay.

6 Claims, 6 Drawing Sheets

| OPERATING MODE | BATTERY VOLTAGE | DURATION | BOOST POWER | POWER SUPPLY INPUT CURRENT (A) |
|---|---|---|---|---|
| NORMAL | 9V TO 16V | NO LIMIT | OFF | 3 |
| LOW VOLTAGE STATE | 9V TO 6V | 1 MINUTE | ON | 4 |
| CRANK | 5V TO 3V | 0.5 SECONDS | ON | 8 |

PROVIDING A BOOST VOLTAGE WITH A TRANSIENT OPERATION

BACKGROUND

Conventionally, automobiles and other vehicles have been driven primarily and almost exclusively via gasoline fueled technologies. An operator of the vehicle may engage the vehicle in a non-operating state employing mostly battery power (i.e. via electric power). After which, the vehicle may be placed in a mode in which the relevant mechanisms for ensuring the vehicle's motion is driven primarily by a fuel, such as gasoline.

Because the motion of the vehicle was primarily driven by gasoline, the conservation of battery power during the gasoline-driven mode was not a priority. However, in recent times, developers of vehicles have moved towards the creation of a multi-mode vehicle. Aspects of the vehicle responsible for the motion of the vehicle may now be operated by a combination of a battery power and gas power.

In certain cases, a vehicle may employ a combination of the various ways to power and drive a motor vehicle. One of the newly implemented techniques is a start-stop system. The start-stop system automatically shuts down and restarts an internal combustion engine to reduce the amount of time the engine spends idling. This reduces fuel consumption, and therefore, increases the overall efficiency of how a vehicle operates.

For example, if the vehicle stops at a traffic light, or in a traffic jam, the engine does not have to be in a state of continual operation. In this case, the start-stop system may actuate, and the vehicle electrical system may be kept running by electric power (rather than fuel). By employing this technology, vehicles may operate in a more efficient manner while reducing harmful effects to the environment.

One of the elements employed to aid in the start-stop system is a boost circuit. The boost circuit essentially detects that the voltage has dropped below a predetermined value (for example, 6.8V), and applies a compensation voltage to a voltage output node (Vout) to compensate for the voltage drop.

Once the voltage on the Vin node rises above a certain value, the boost circuit is disabled.

Figure 1:
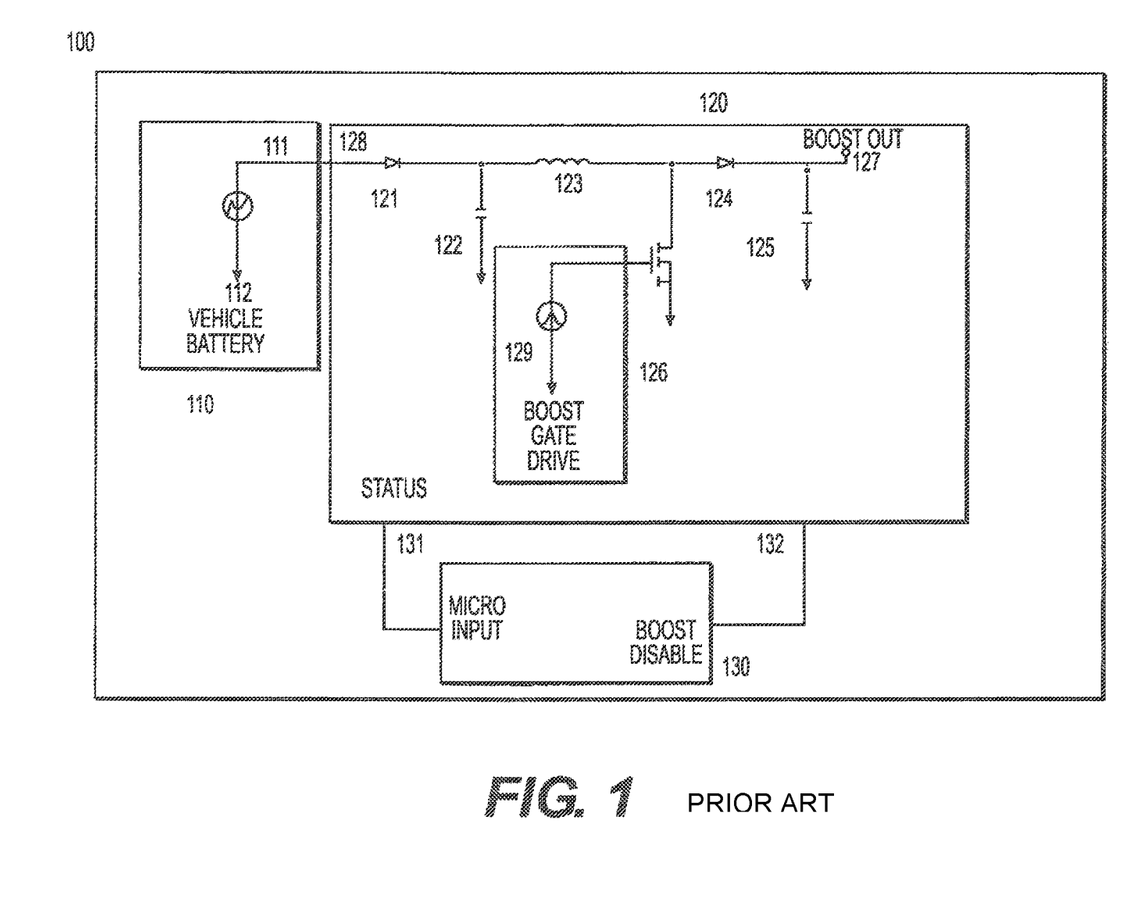
FIG. 1 illustrates an example of a conventional implementation of a start-stop system.

FIG. 1 illustrates an example of a conventional implementation of a start-stop system 100. The system 100 includes a vehicle battery 110, a boost circuit 120, and a microcontroller 130.

The vehicle battery 110 serves to provide power to various elements and parts in a vehicle, and has ground node 112, and is connected to the boost circuit 120 via node 111. In the context shown in FIG. 1, the vehicle battery 110 serves to power the boost circuit 120 from node 111 to an input node 128. The boost circuit 120 includes various circuit elements, such as elements 121-125. The explanation of the elements 121-125 will be omitted as the boost circuit 120 shown in FIG. 1 is known to one of ordinary skill in the art. The control of the boost circuit 120 is accomplished by applying a sequence of voltage pulses with a particular duty cycle to a transistor gate 126, and a supply 129. The supply 129 is a signal that controls the voltage/charge pumping associated with boost circuit 120. Essentially, if the vehicle battery 110 is loaded by a demand for more power, the supply 129 applies a voltage pulse sequence to the gate 126, thereby allowing boost circuit 120 to operate to provide boost voltage.

The microprocessor 130 monitors the status 131 of the boost circuit 120 (i.e. determines how much voltage the boost circuit 120 is generating or needs to generate), and disables or enable the boost circuit 120 via control input 132. In this way, the microprocessor 130 may effectively determine whether the boost circuit 120 is turned on/off to boost the amount of voltage required for the operation of a vehicle in a stop mode of a start-stop system.

In essence, with a motor in a start-stop system 100 as shown above is in a stop situation (i.e. idled or stopped), if an operator of the vehicle engages a gas pedal, a boost of current is usually required to aid in the restart of the engine. This energy is drawn from the battery 110 shown above, which leads to the battery 110 being heavily loaded, and potentially causing spikes. Since various elements of the vehicle may rely on the battery 110 (for example, the lighting, sound, HVAC, etc)—various operations may be suspended, frustrated, or altered—thereby effecting the overall experience with a vehicle in a start-stop system.

The conventional system above employs the status pin 131 to determine whether to enable the boost circuit 120. Thus, the boost circuit 120 may continually run in two situations, when a crank is detected (i.e. a gas pedal is asserted to leave a stop mode), or when the battery voltage is detected as low. However, each of the states may require a different amount of boost voltage/power for a different time amount. Employing the aspects disclosed above with FIG. 1, providing different amounts of boost voltage/power for different time amounts is not possible.

SUMMARY

A system, method and circuit for providing a boost voltage with a transient operation of a vehicular start-stop system are provided. The system includes a duty cycle monitor to detect a change in duty cycle based on the transient operation; a crank time-out detector to determine whether the change in duty cycle is over a predetermined threshold; and a reset generator to generate a reset of a boost circuit that generates the boost voltage after a predetermined delay.

DESCRIPTION OF THE DRAWINGS

The detailed description refers to the following drawings, in which like numerals refer to like items, and in which.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Start-stop systems are employed to ensure that modern vehicles operate in an efficient manner, and allow for the conservation of energy when a vehicle is not moving or accelerating. The start-stop system may be implemented with a boost circuit that pumps voltage or charge during the transition from "stop mode", to "start mode". A start mode may refer to a mode in which the vehicle is moving or accelerating.

However, the conventional boosting circuitry merely detects battery voltage, and enables a boost circuit based on the detected battery voltage. The conventional boosting circuitry, being dependent on a reading of battery voltage, may actuate in cases where the boost circuit is not wholly needed (for example, if the battery is detected at a low voltage). Thus, a boost circuit may have to be larger and consume more energy due to the introduced inefficiency discussed above.

Disclosed herein are methods and systems for providing a boost circuit with a transient operation. By activating the boost circuit in cases where a transient is detected (i.e. the assertion of a gas pedal, or re-activation of an engine from a stop or idle state), the boost circuit may be efficiently sized and operated to provide the amount of energy required to operate smoothly, and not provide energy in cases where boost voltage is not require, or enough boost voltage has provided.

Thus, a start-stop system employing the aspects disclosed herein may operate more smoothly, and in turn, operate in an efficient matter. Another advantage is that by employing the aspects disclosed herein, the boost circuit may be provided with smaller circuit elements than those known in conventional implementations. The justification for providing smaller elements will be explained in greater detail below.

Figure 2:
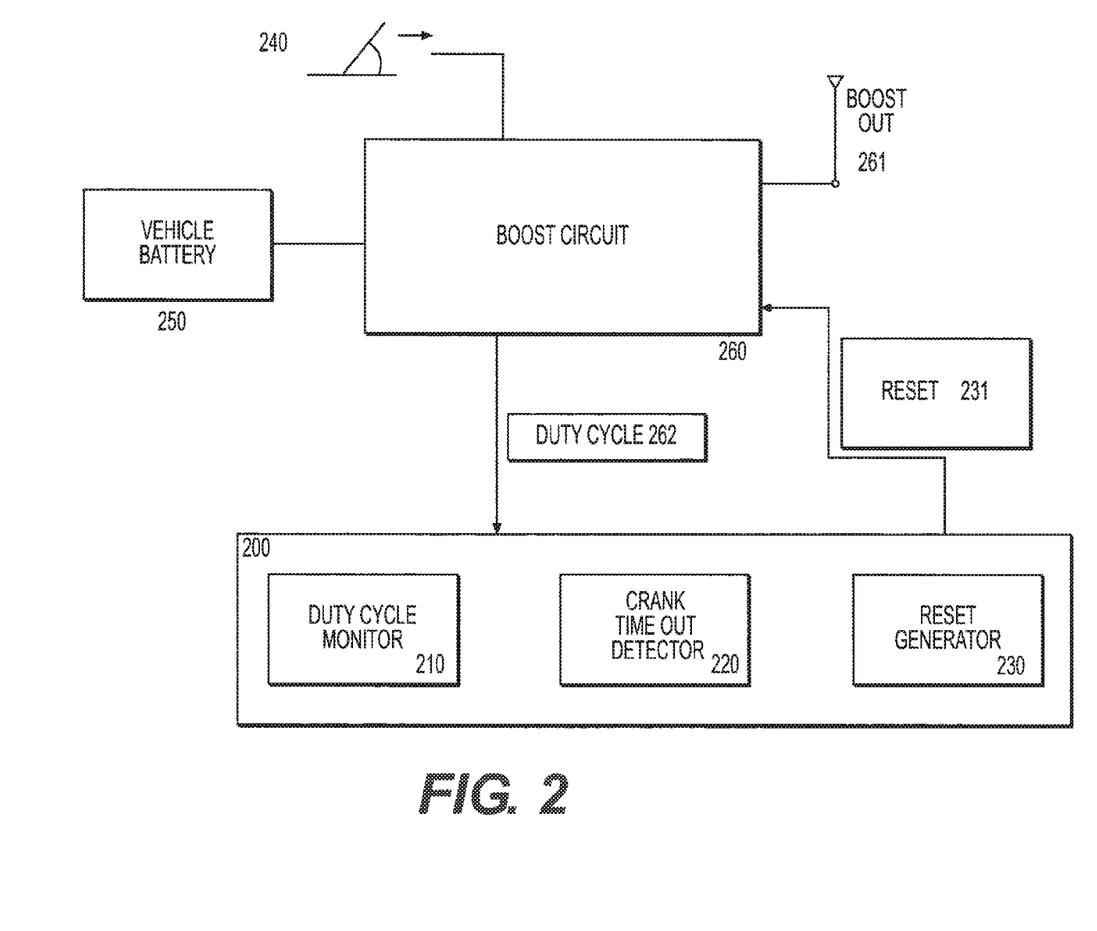
FIG. 2 is an example of a system for providing a boost voltage with a transient operation.

FIG. 2 is an example of a system 200 for providing a boost voltage/power with a transient operation. The transient operation may refer to any sort of loading of a vehicle battery 250. The system 200 may be implemented with existing start-stop systems, or be integrated into a start-stop system implemented with a vehicle. The system 200 includes a duty cycle monitor 210, a crank time-out detector 220, and a reset generator 230.

Referring to FIG. 2, a gas pedal 240, a vehicle battery 250, and a boost circuit 260 are shown. The boost circuit 260 may be in communication with system 200 in a wired fashion, and be controlled via system 200 through various input/output nodes.

The gas pedal 240 is shown. However, any sort of signaling from a gas pedal or engine acceleration device may be employed. Thus, a sensor may be implemented with a device to determine engine acceleration, and indicate to the boost circuit 260 that an engine acceleration is requested. This may cause the vehicle incorporating a start-stop system to exit a stop mode, and re-enter a start mode.

The vehicle battery 260 and boost circuit 260 may operate similarly to the elements shown in FIG. 1, and thus, an explanation of these parts is omitted.

The duty cycle monitor 210 monitors the boost circuit 260, and specifically a gate node (not shown in FIG. 2) that provides input voltage during a mode in which boost voltage is needed. When a signal instructing the boost circuit 260 to turn on is detected (in this case, a detection that the vehicle batter 250 is being loaded over a specific amount), a voltage essentially turning on the boost circuit 260 is activated. This causes a duty cycle 231 to be generated (of a predetermined amount). The change in operation (as indicated via the duty cycle 231) is detected via a hardware element implemented via circuitry in via the duty cycle monitor 210. Essentially, a pulse is latched that is propagated to the crank time-out detector 220.

The crank time-out detector 220 receives the indication from the duty cycle monitor 210 that a crank operation (i.e. a restarting of an engine) has occurred or been instigate. The main function of the crank time-out detector 220 is to determine that the indication from the duty cycle monitor 210 is a signal strength over a predetermined threshold.

If the signal strength is over a predetermined threshold, the crank time-out detector 220 may detect that the duty cycle change detected via element 210 correctly corresponds to a detected crank operation. The crank time-out detector 220 may transmit an indication to the reset generator 230.

If the signal strength is under a predetermined threshold, the crank time-out detector 220 ignores the indication from the duty cycle monitor 210. This may indicate that the vehicle battery 250 is low for other reasons.

The reset generator 230 resets the boost circuit 260, via a reset signal 231, and essentially turns off the boost generation via the boost circuit 260. Various delay elements, for example, those shown in FIG. 3, may be introduced to ensure an adequate delay so that the boost circuit 260 may operate for a predetermined amount of time.

The boost circuit 260 is allowed to operate for the predetermined amount of time (before the reset 231 is activated), and essentially provide boost voltage for the predetermined amount of time. This boost voltage may effectively be driven to the start-stop system via output node 261.

Figure 3:
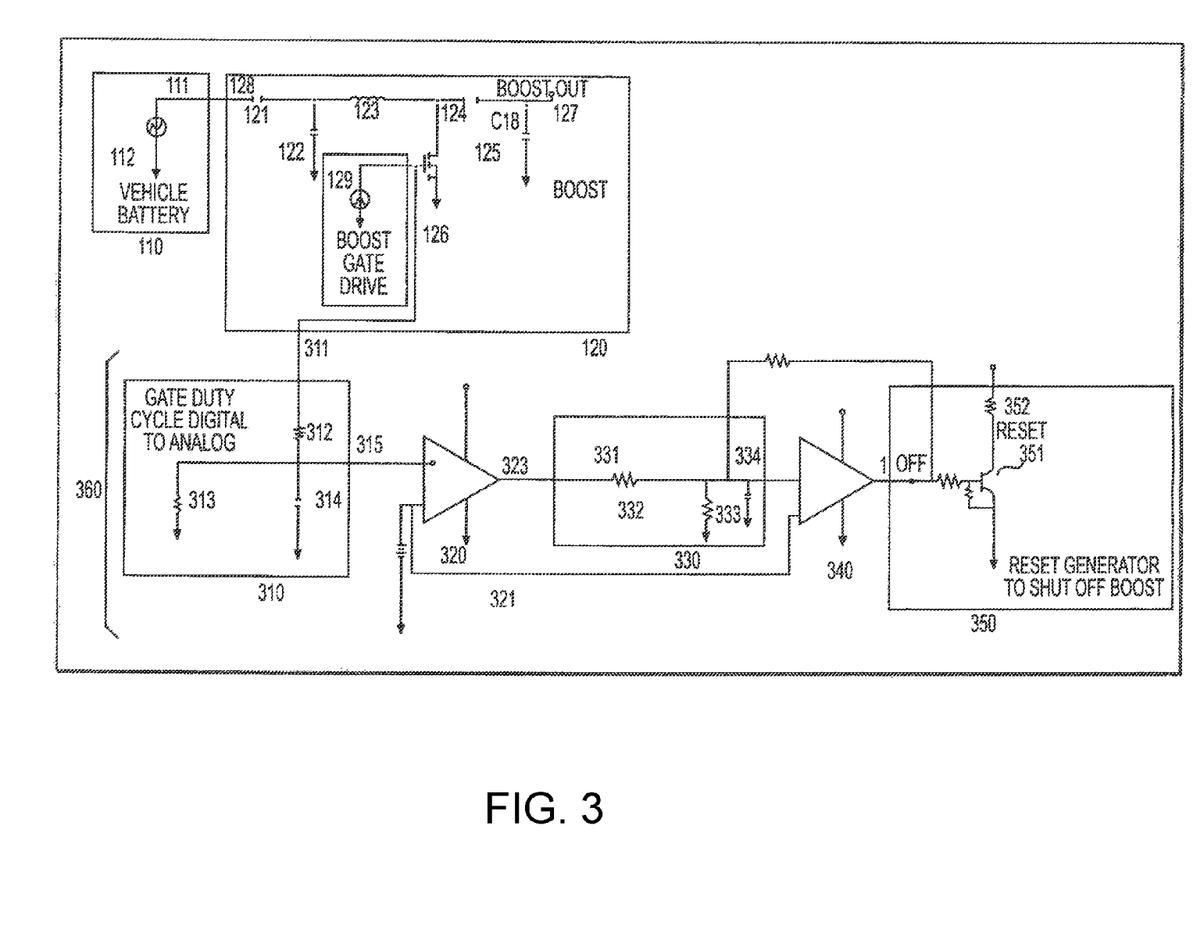
FIG. 3 is an example of a circuit for providing a boost voltage with a transient operation.

FIG. 3 illustrates an example of a circuit device 300 for implementing the system 200. The circuit device 300 includes a vehicle battery 110, a boost circuit 120, a gate duty cycle digital-to-analog circuit 310, a first opamp (operational amplifier) 320, a crank time out circuit 330, a second opamp 330, and a reset generator 340.

The gate duty cycle digital to analog circuit 310 is connected to the boost circuit 120 via a boost gate drive 129. The boost gate drive 129 is a power source that detects that the vehicle batter 110 is loaded, and thus creates a duty cycle which is communicated to element 310 via node 311.

Accordingly, resistors 312 and 313, and capacitor 314 form a digital-to-analog converter. These circuit elements detect the amount of load generated via node 311, and create an analog signal 315 accordingly.

This signal is propagated to an opamp 320, that is biased via an element 321. The opamp 320 compares node 322 with bias 321 to determine whether the analog signal 315 is over a predetermined threshold. In the case that it is, node 323 (the output of opamp 320) indicates a signal to generate a crank time out.

A signal via node 323 is propagated to the crank time-out circuit 330. The signal essentially goes through an RC circuit, as depicted via resistor 331 and 332, and capacitor 333. An output node 334 is propagated to the second opamp 340.

The second opamp 340 essentially serves as a buffer to propagate the crank time-out operation to the reset generator circuit 350. Once an adequate time has passed, as predetermined by an implementer of circuit 300 and carried out through adequately sizing the resistor and capacitor in an appropriate size, the gate 351 of the reset generator is pulled down, and the reset node 352 is propagated back either to the boost circuit 120, thereby turning off the boost circuit 120, or to circuits supplied by the boost out 127, thereby reducing the load of the boost circuit 120.

A signal indicating a reset is propagated via the reset node 352 to a centralized microcontroller that may be configured to disable the boost circuit 120.

Thus, employing a start-stop system with the circuit 300 shown above, an implementer may efficiently operate the boost system. In this way, the boost circuit 120 may operate for an adequate or configured amount of time based on the timer or time-out introduced via the elements described above. In this case, because the boost circuit 120 operates for a fixed amount of time while a crank operation is detected, the boost circuit 120 does not deliver power for a longer time than needed, and delivers an adequate amount of power to ensure that restart (i.e. the transition from a stop mode to a start mode) is accomplished in an efficient manner.

Figure 4:
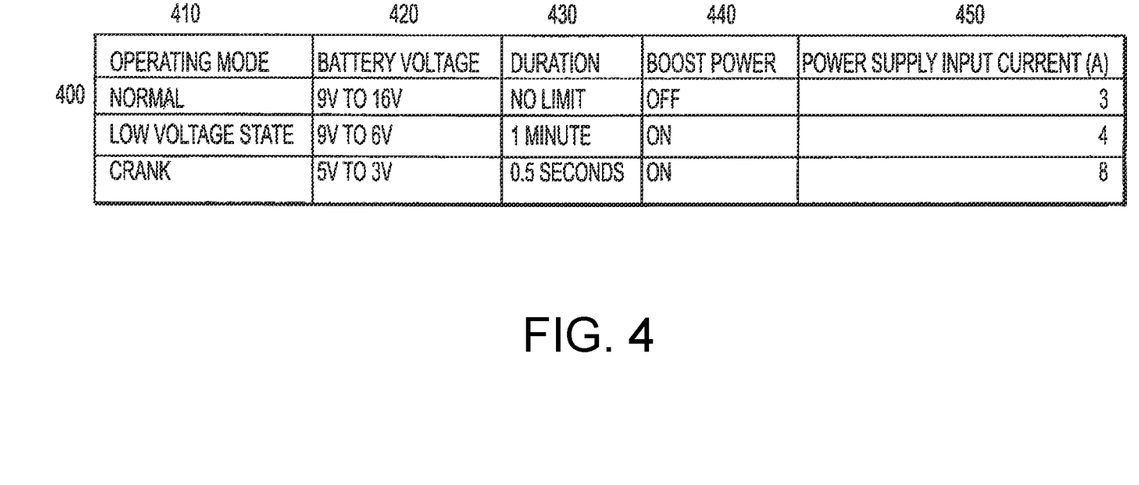
FIG. 4 illustrates an example chart based on an implementation of the system of FIG. 2 or the circuit of FIG. 3.

FIG. 4 illustrates an example chart 400 of an example implementation of the system 200 or the circuit 300. The chart 400 has an operating mode field 410, a battery voltage field 420, a duration field 430, a boost power field 440, and a power supply input current (Amperes) field 450.

The normal operation indicates that the battery voltage is within a normal operating condition. As such, boost power is not needed, and thus, the boost circuit is turned off.

In a low voltage state, the boost power is needed, and the boost power is kept on for an hour. Because the battery regeneration is not as load heavy as, for example, a crank operation, the power supply delivers 4 amperes, thereby regenerating the battery voltage. In this situation, the amount of amperes is relatively small, and thus, leaving the boost power on for a longer time period (in this case 1 minute) is not harmful or wasteful for energy consumption.

In the crank mode, the boost power is left on for 0.5 seconds. In this case, relative to the other modes, the boost power is stressed at a greater amount. Thus, leaving the boost power on for too long leads to unnecessary and over power consumption.

This is the amount of time needed to effectively allow regeneration of the power to go into "start mode". Because the duration time is only 0.5 seconds, and the amount of power that is drawn is significant (in this case 8 amperes), energy and power is effectively conserved. Thus, the boost is enacted for 0.5 seconds, in this case, an adequate enough time to provide boost power to restart the vehicle.

Figure 5:
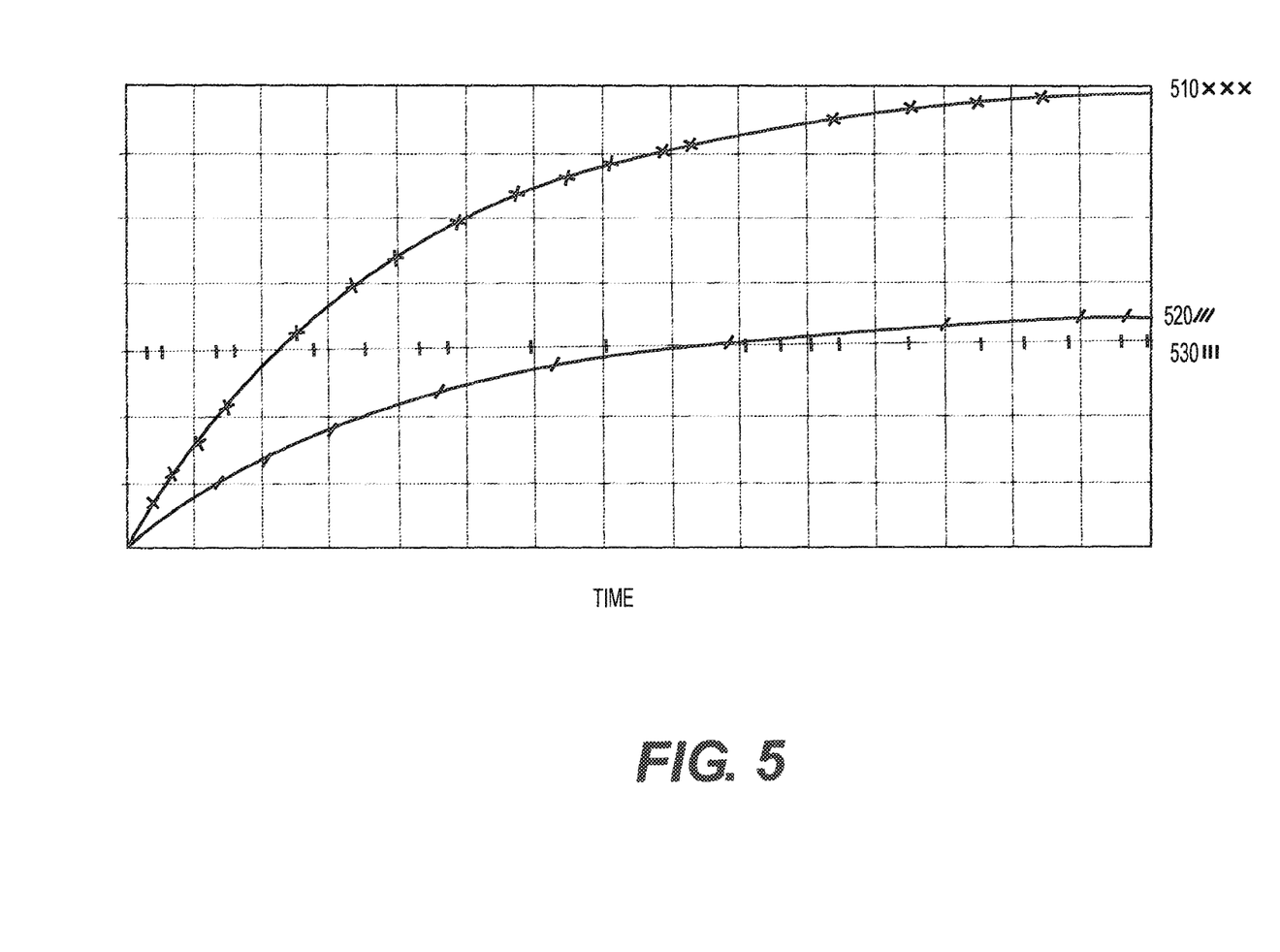
FIG. 5 illustrates another example implementation of the system in FIG. 2 or the circuit in FIG. 3 with various crank modes as shown on the illustrated graph.

FIG. 5 illustrates another example an implementation of the system 200 or the circuit 300 with various crank modes as shown on the illustrated graph 500.

A crank may be severe 510 or normal 520. The severe crank 510 and the normal crank 520 are shown along with a reference 530. A severe crank 510 draws more power, and is in danger of drawing power from a power supply at an alarming or dangerous rate. In this case, the way that circuit 300 is implemented allows for a quicker reset (and subsequent) shutting off of the power supply.

If the normal crank 520 is applied, the reset may occur at a slower rate, thereby shutting off at a time further in the future. A normal crank 520 draws less power, and thus, having the boost power generate power for a longer time may not be as wasteful or damaging to the vehicle's power supply.

Figure 6:
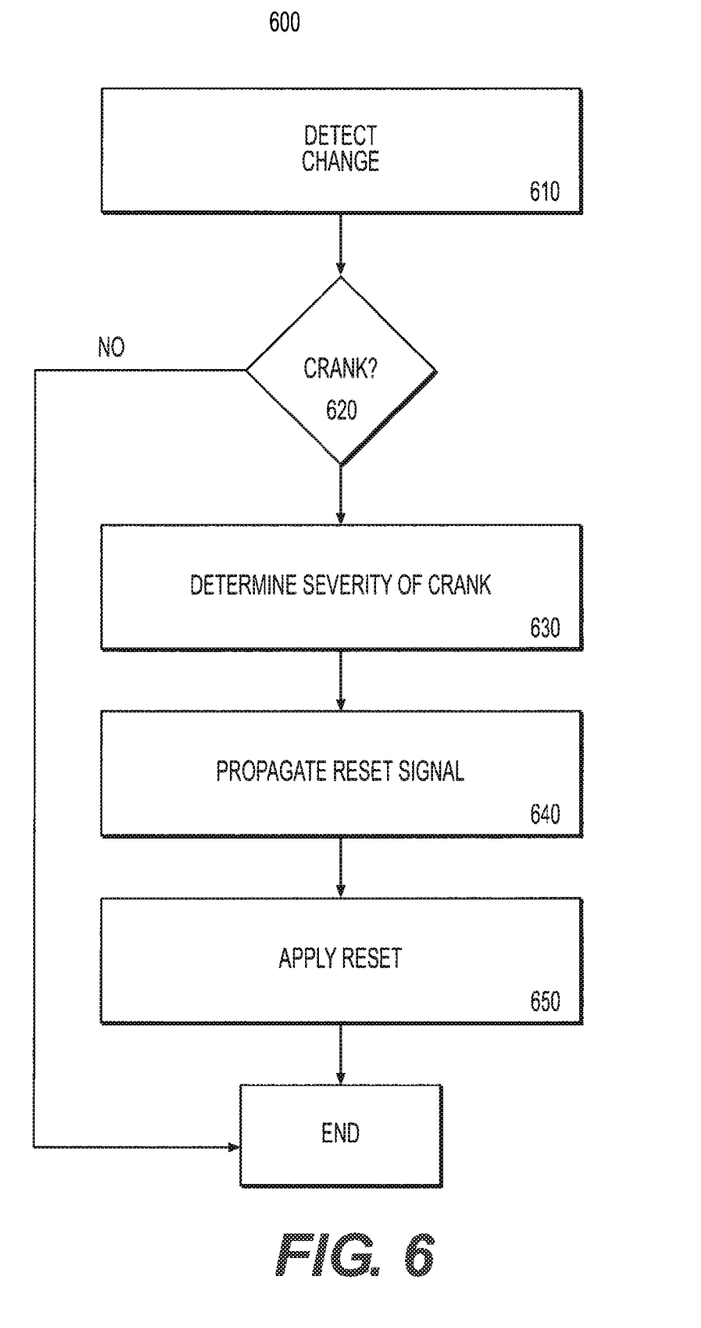
FIG. 6 illustrates a method for providing a boost voltage based on a transient operation.

FIG. 6 illustrates a method 600 for providing a boost voltage based on a transient operation.

In operation 610, a detection of a change in a duty cycle associated with a load to a vehicular power supply is detected. As explained above, a variety of factors may affect the duty cycle associated with a boost power supply. The duty cycle may be affected by the battery being low (due to current draw from various electronics associated with the vehicle). In another example, the duty cycle may be effected by a crank operation.

In operation 620, a determination is made as to whether the duty cycle change detected in operation 610 is over a specific threshold. If so, the method 600 proceeds to operation 620. If not, the method 600 proceeds to end.

In operation 630, the degree of the crank is determined. Once the degree of the crank is determined, the amount of time the reset signal is delayed may be set (operation 640). As explained in FIG. 5, the severity of the crank (i.e. a crank that requires more voltage/current/power) may relate to a quicker reset signal being asserted.

In operation 650, the reset signal is propagated to a microcontroller to shut off the boost power supply, or de-attach an element that is loading the boost power supply. In another example, the reset signal may be propagated directly to the boost power supply, thereby shutting off the boost power supply.

In addition to detection of duty cycle 262 by a duty cycle monitor 210, this method can also be implemented by measurement of current at any point in the boost circuit (121, 122, 123, 124, 125, 126). In this implementation the duty cycle monitor 210 being replaced by a current monitor.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for providing a boost voltage for augmenting a vehicular battery voltage with a transient operation of a vehicular start-stop system, comprising:
   a duty cycle monitor or current monitor to detect a change in duty cycle or current of a vehicular battery, the vehicular battery being electrically coupled to the system, based on the transient operation;
   a crank time-out detector to determine whether the change in duty cycle or current is over a predetermined threshold; and
   a reset generator to generate a reset of a boost circuit, that generates the boost voltage, after a predetermined delay, the predetermined delay being based in part by the change in the duty cycle;
   wherein the duty cycle monitor or current monitor is further configured to monitor a rate of change associated with power being consumed during the transient operation, wherein the predetermined delay is further defined by the rate of change.

2. The system according to claim 1, wherein the crank time-out detector is further configured to determine the transient operation if the duty cycle is below a predetermined threshold, and in response to duty cycle being below a predetermined threshold, disabling the reset generator.

3. The system according to claim 2, wherein the transient operation indicates that the vehicular battery voltage is below a predetermined battery voltage threshold.

4. A method for providing a boost voltage for augmenting a vehicular battery voltage with a transient operation of a vehicular start-stop system, comprising:
performing via a processor the following steps:
detecting a change in a duty cycle or current of a vehicular battery, based on the transient operation, the transient operation corresponding to an additional loading of a vehicular battery;
determining whether the change is above a predetermined threshold;
monitoring a rate of change associated with power being consumed during the transient operation;
propagating a delay of reset signal in response to the change corresponding to the transient operation based on the determination and the monitored rate of change; and
applying the reset signal.

5. The method according to claim 4, further comprising determining the transient operation if the duty cycle is below a predetermined threshold, and in response to duty cycle being below a predetermined, not applying the reset signal.

6. The method according to claim 5, wherein the transient operation indicates that the vehicular battery voltage is below a predetermined battery voltage threshold.

* * * * *